(12) United States Patent
Kawai et al.

(10) Patent No.: US 6,851,410 B2
(45) Date of Patent: Feb. 8, 2005

(54) THROTTLE CONTROL DEVICE

(75) Inventors: Shinji Kawai, Aichi-ken (JP); Hisashi Kino, Aichi-ken (JP); Tomiharu Isogai, Aichi (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/680,430

(22) Filed: Oct. 8, 2003

(65) Prior Publication Data

US 2004/0094122 A1 May 20, 2004

(30) Foreign Application Priority Data

Oct. 9, 2002 (JP) ........................................ 2002-296632

(51) Int. Cl.[7] .............................................. F02D 9/02
(52) U.S. Cl. ...................................................... 123/399
(58) Field of Search ................................. 123/361, 399

(56) References Cited

U.S. PATENT DOCUMENTS

| | | | | |
|---|---|---|---|---|
| 5,141,070 A | * | 8/1992 | Hickmann et al. | 123/396 |
| 5,431,141 A | * | 7/1995 | Kanazawa et al. | 123/399 |
| 5,934,250 A | * | 8/1999 | Fujikawa et al. | 123/399 |

FOREIGN PATENT DOCUMENTS

| | | |
|---|---|---|
| EP | 1099840 | 5/2001 |
| EP | 1217192 | 6/2002 |
| JP | 10325341 | 12/1998 |
| JP | 2000265861 | 9/2000 |
| JP | 2001132495 | 5/2001 |

* cited by examiner

*Primary Examiner*—Tony M. Argenbright
(74) *Attorney, Agent, or Firm*—Dennison, Schultz, Dougherty & MacDonald

(57) ABSTRACT

A throttle control device has a throttle body (TB) in which an intake passage (1a) is formed. A throttle valve (2) is rotatably arranged within the intake passage. A motor (4) rotates the throttle valve. The throttle body has a gear accommodating chamber (19), in which is arranged gear mechanism (35). The gear mechanism transmits the rotation of the motor to the throttle valve, and has at least one gear (14). A shaft (34; 134) rotatably supports the gear. The shaft is a unitary member formed integrally on a wall surface (1b, 18b) of the gear accommodating chamber in a cantilever fashion. The shaft may have first shaft portion (34a) formed integrally on first wall surface (1b) of the gear accommodating chamber in a cantilever fashion and second shaft portion (34b) formed integrally on a second wall surface (18a) of the gear accommodating chamber in a cantilever fashion.

25 Claims, 5 Drawing Sheets

THROTTLE CONTROL DEVICE

This application claims priority to Japanese application serial Number 2002-296632 which application is hereby incorporated by reference herein in its entirety.

BACKGROUND OF THE INVENTION

1. Field of the Invention

The present invention relates to a throttle control device equipped with a throttle valve for controlling a flow rate of a fluid, in particular, to a throttle control device for controlling the flow rate of air, for example, intake air to be supplied to an automotive engine.

2. Description of the Related Art

Japanese Laid-Open Patent Publication No. 2001-132495 discloses a conventional throttle control device. In the throttle control device disclosed in this gazette, a throttle valve is arranged in an intake passage formed in a throttle body and is rotated by a motor. As the throttle valve rotates, the intake passage is incrementally opened and closed to thereby control the intake air amount. Further, this device has a gear mechanism including a counter gear arranged in a gear accommodating chamber provided in the throttle body. The counter gear transmits the driving force of the motor to the throttle valve. A counter shaft rotatably supporting the counter gear is fixed to the wall of the gear accommodating chamber by press-fitting or similar method (See the description on page 3 and FIG. 1).

The conventional throttle control device requires a counter shaft, a separate component not part of the throttle body. Further, it also requires a press-fitting operation in order to attach the counter shaft. As a result of the assembly process, the conventional throttle control device involves a relatively high cost. Although it might be possible to form the throttle body of resin and assemble the countershaft by an insert molding process, this would also involve a relatively high assembly cost similar to the above process.

SUMMARY OF THE INVENTION

It is accordingly an object of the present invention to provide a throttle control device that allows reduction in the number of separate components and in the number of required assembly steps.

A throttle control device according to the present invention has a throttle body in which an intake passage is formed. A throttle valve is rotatably arranged within the intake passage. A motor rotates the throttle valve. The throttle body is equipped with a gear accommodating chamber. A gear mechanism is arranged in the gear accommodating chamber. The gear mechanism is adapted to transmit the rotation of the motor to the throttle valve. Further, the gear mechanism has at least one gear such as a counter gear. A shaft rotatably supports the gear.

According to a first aspect of the invention, the gear accommodating chamber has a first wall surface and a second wall surface that are opposed to each other in an axial direction of the shaft. The shaft has a first shaft portion formed integrally with the first wall surface in a cantilever fashion and a second shaft portion formed integrally with the second wall surface also in a cantilever fashion.

In this construction, there is no need to provide a shaft that is a separate component from the throttle body, thereby reducing the number of individual components and the number of assembly steps.

It is desirable to provide a predetermined gap between the first shaft portion and the second shaft portion.

Further, it is desirable to provide a reinforcing portion to be formed around the first shaft portion on the first wall surface and/or around the second shaft portion on the second wall surface.

According to a second aspect of the present invention, the shaft is a single unitary member formed integrally with a wall surface of the gear accommodating chamber in a cantilever fashion.

Also in this second aspect form of construction, there is no need to provide a shaft that is a separate component from the throttle body, thereby reducing the overall number of components and the number of separate assembly steps.

In this case, it is desirable for the shaft to be formed integrally with one of the first or second wall surfaces opposed to each other in the axial direction of the shaft. It is also desirable to have a predetermined gap left between an end of the shaft and the other wall surface.

Further, it is desirable for the shaft to be equipped with a reinforcing portion at the end thereof integral with the one wall surface side. A tapered portion whose diameter gradually increases toward the one wall surface may form this reinforcing portion, for example.

In both the first and second aspect of the present invention, there maybe further provided a collar situated between the shaft and the gear. It is desirable that the collar be formed of a material superior to the shaft and/or the gear in respect to wear resistance. This construction helps mitigate the wear of the shaft and/or the gear, thereby achieving an improvement in terms of durability of the assembly.

Additionally, it is desirable for the collar to be fixed to one of the shaft or the gear, whichever one is formed of a lower wear resistance material. The collar is in sliding contact with the other of the shaft or the gear.

Further, in the case of the construction, the gear accommodating chamber has the first wall surface and the second wall surface opposed to each other in the axial direction of the shaft. It is desirable for the throttle body to have a main body and a cover which is connected to the main body. The cover is a component separate from the main body. It is preferred that the gear accommodating chamber be formed between the main body and the cover; the first wall surface being formed by the main body, and the second wall surface being formed by the cover.

In this system of construction, the shaft is first formed integrally with the main body and/or the cover by a wellknown molding method, an example of which is injection molding. Then the main body and the cover are connected to each other, making it possible to easily create a gear accommodating chamber containing the shaft.

BRIEF DESCRIPTION OF THE DRAWINGS

Additional objects, features and advantages of the present invention will be readily understood after reading the following detailed description together with the claims and the accompanying drawings, in which:

DESCRIPTION OF THE PREFERRED EMBODIMENTS

First to third embodiments of the present invention will now be described with reference to the drawings.

[First Embodiment]

A throttle control device according to a first embodiment of the present invention will be described with reference to FIGS. 1 through 5. First, the throttle control device will be described in general. The throttle control device of this embodiment is formed as an electronic-control type throttle control device for controlling the throttle valve opening in response to signals from an engine control unit (ECU) of an automobile (not shown), including, but not limited to signals such as an acceleration signal related to an accelerator pedal depression amount, a traction control signal, a constant-speed traveling signal such as from a cruise control device, and an idling speed control signal.

Figure 1:
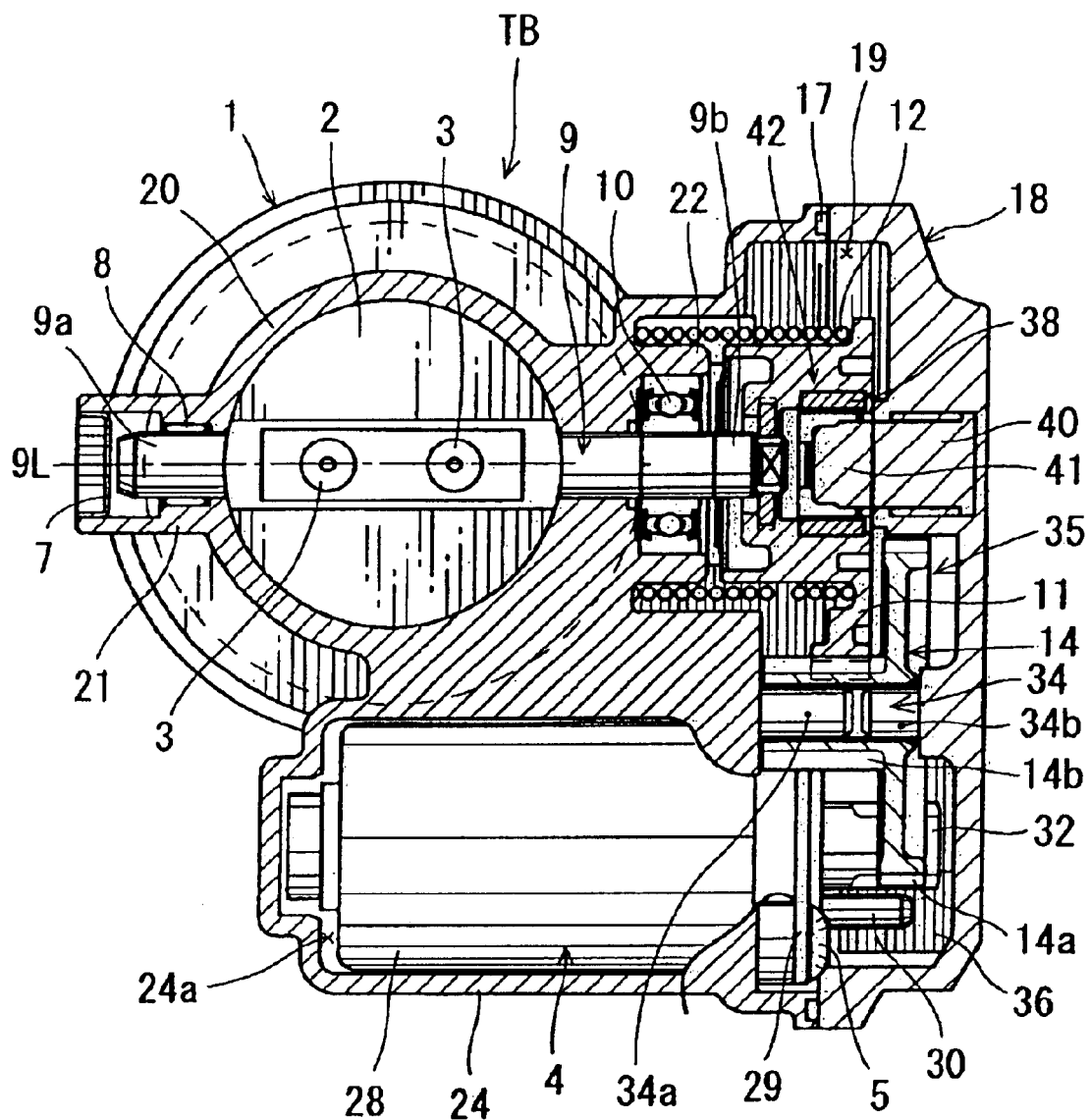
FIG. 1 is a cross-sectional view of a throttle control device according to a first embodiment of the present invention.
Figure 2:
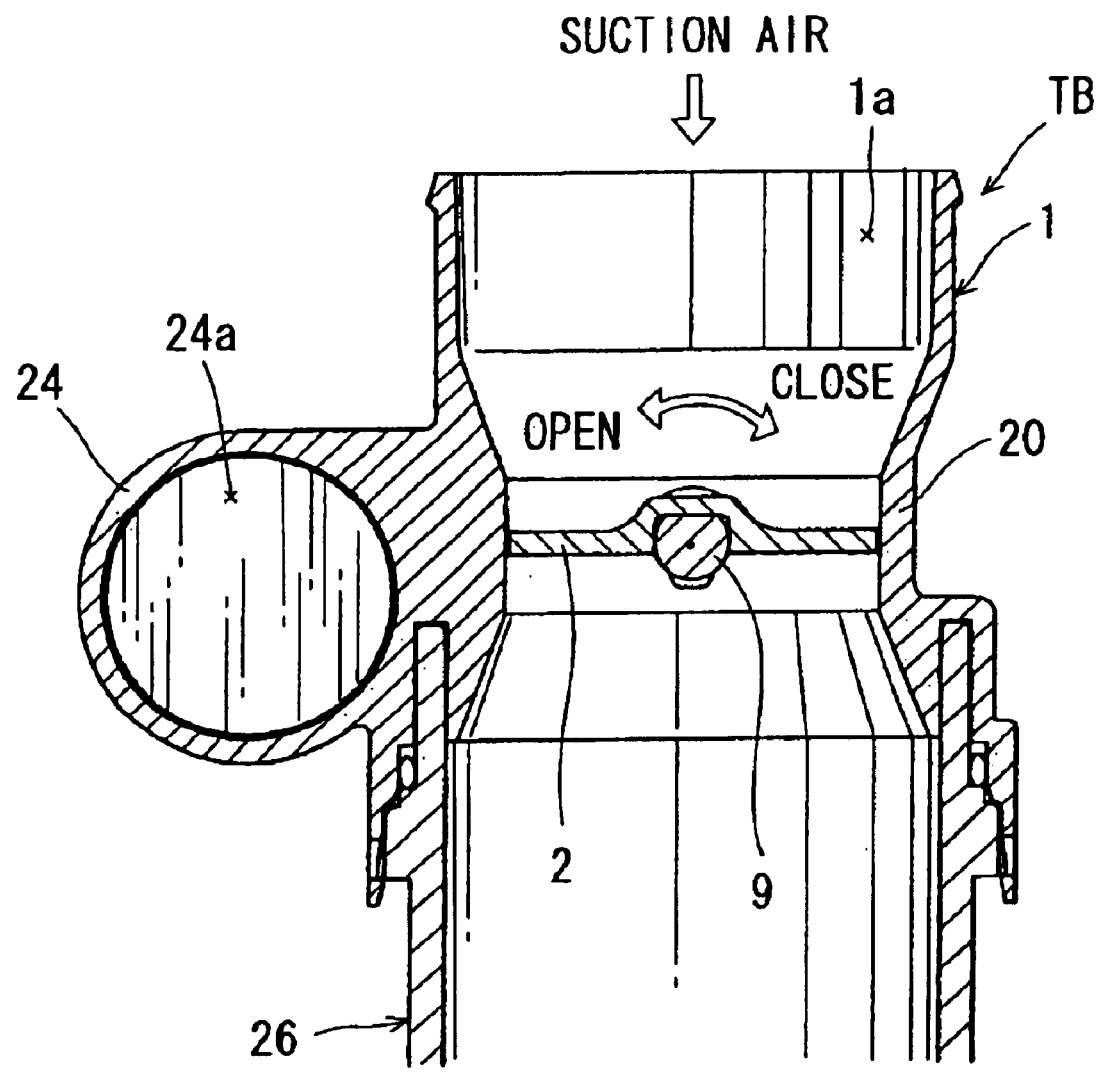
FIG. 2 is a vertical sectional view of the throttle control device of FIG. 1.

Referring to FIGS. 1 and 2, the throttle control device of this embodiment is equipped with a throttle body assembly TB. The throttle body assembly TB includes a throttle body 1 and a cover 18. The throttle body 1 is equipped with a main body portion 20 and a motor housing portion 24, which may be formed as an integral unit using resin. As shown in FIG. 2, formed in the main body portion 20 is a substantially cylindrical intake passage 1a extending vertically as viewed in the FIG. 2. Further, in FIG. 2, an air cleaner (not shown) is connected to an upper portion of the main body portion 20, and an intake manifold 26 is connected to a lower portion thereof.

In the main body portion 20, there is mounted a metal throttle shaft 9 radially extending across the intake passage 1a (See FIG. 1). As shown in FIG. 1, bearing portions 21 and 22 through the intermediation of bearings 8 and 10 rotatably supports end portions 9a and 9b, respectively, of the throttle shaft 9. A throttle valve 2, made of resin for example, is fixed to the throttle shaft 9, possibly by means of a plurality of rivets 3 as shown. The throttle valve 2, which is situated inside the intake passage 1a, rotates so as to close the intake passage 1a as the throttle shaft 9 rotates in one direction, and rotates so as to open the intake passage 1a as the throttle shaft 9 rotates in the other direction. These incremental opening and closing movements of the throttle valve 2 controls the amount of intake air flowing through the intake passage 1a. In FIG. 2, the throttle valve 2 is in a fully closed position. When the throttle valve in the fully closed position is rotated counterclockwise, as viewed in FIG. 2, the intake passage (1a) is opened.

A plug 7 for confining the end portion 9a within the main body portion 20 is fitted into the bearing portion 21. Bearing portion 21 supports one end portion 9a (the left-hand end as seen in FIG. 1) of the throttle shaft 9. The other end portion 9b (the right-hand end as seen in FIG. 1) of the throttle shaft 9 extends through the bearing portion 22 and protrudes further to the right. A throttle gear 11 consisting of a sector gear is fixed to the protruding end of this end portion 9b so as not to allow relative rotation. A spring force, such as a torsion coil spring 12, is provided between the outer peripheral portion of the bearing portion 22 of the throttle body 1 and the outer peripheral portion of the throttle gear 11. This torsion coil spring 12 always urges the throttle valve 2 so as to close it through the throttle gear 11 and the throttle shaft 9. Further, although not shown, provided between the throttle body 1 and the throttle gear 11 is a stopper for preventing the throttle valve 2 from rotating in the closing direction beyond the fully closed position.

As shown in FIG. 1, the motor housing portion 24 of the throttle body 1 is formed in a cylindrical configuration having an axis substantially parallel with an axis 9L of the throttle shaft 9. One axial end (the left-hand end as seen in the drawing) of the motor housing 24 is closed. The interior of the motor housing portion 24 defines a space 24a open on the right-hand side of the throttle body 1. The space 24a accommodates a motor 4 that may be, for example, a DC motor. In the accommodation state as shown, the axis of the motor 4 extends parallel to the axis 9L of the throttle shaft 9. An output shaft 4a (See FIG. 3) of the motor 4 is positioned to the right, as seen in FIG. 1. The motor 4 has a motor casing 28 that defines an outer surface of the motor 4. Provided on the right-hand side of the motor casing 28 is a mounting flange 29, which is fastened to the motor housing portion 24, preferably by means of a plurality of screws 5 (See FIG. 3).

Figure 3:
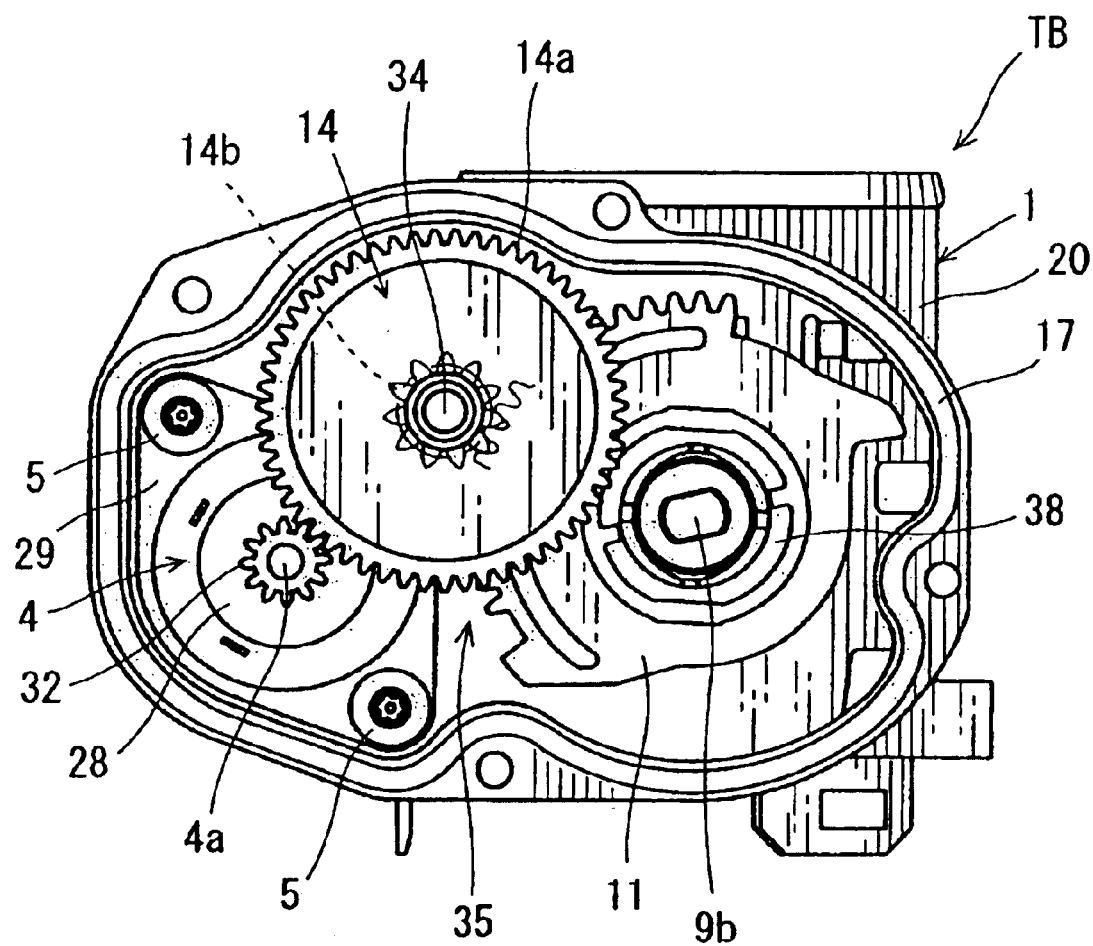
FIG. 3 is a side view of the throttle control device, with the cover removed therefrom.

The output shaft 4a of the motor 4 protrudes to the right as seen in FIG. 1 beyond the mounting flange 29, and a motor pinion 32 is fastened to this protruding portion (See FIG. 3). Further, as shown in FIG. 1, a counter shaft 34 is mounted to the throttle body 1 at a position between the main body portion 20 and the motor housing portion 24. The counter shaft 34 extends parallel to the axis 9L of the throttle shaft 9. A counter gear 14 is rotatably mounted to the counter shaft 34. The counter gear 14 has two gear portions 14a and 14b having different gear diameters. The large diameter gear portion 14a is in mesh with the motor pinion 32, and the small diameter gear portion 14b is in mesh with the throttle gear 11 (See FIG. 1). The motor pinion 32 the counter gear 14, and the throttle gear 11 constitute a speed reduction gear mechanism 35.

As shown in FIG. 1, a cover 18 mainly covering the speed reduction gear mechanism 35 is connected to the right-hand side surface of the throttle body 1 by a coupling means (not shown), for example, a coupling means may include a snap-fitting means, screw means, or clamp means, among others. Between the right-hand side surface of the throttle body 1 and the cover 18, there is provided an O-ring 17 to maintain these components in a sealed state. The throttle body 1 and the cover 18 form a gear accommodating chamber 19, accommodating the gear mechanism 35 within the gear accommodating chamber 19. Further, the motor 4 has a motor terminal 30 protruding from the mounting flange 29, and this motor terminal 30 is electrically connected to a battery (not shown) and, further, to the ECU by way of a relay terminal (not shown) of a relay connector 36 provided in the cover 18. Thus, the motor 4 is driven in accordance with an acceleration signal as described at the beginning of the description. The driving force of the motor 4 is transmitted to the throttle shaft 9 through the speed reduction gear mechanism 35, that is, through the motor pinion 32, the counter gear 14, and the throttle gear 11.

A ring-shaped magnet 38 is provided on the right-hand side surface of the throttle gear 11. This magnet 38 has a pair of semi-arcuate magnet segments exhibiting different polarities. Inside the cover 18, there is mounted a circuit board 40 opposed to the end surface of the throttle shaft 9. Mounted on the circuit board 40 is a Hall effect element 41 situated inside the magnet 38. When the throttle gear 11 rotates with the throttle shaft 9, the Hall element 41 detects a change in the magnetic field due to the magnet 38, and generates a Hall voltage. The Hall voltage generated by the Hall element 41 is input to the ECU by way of the circuit board 40 and the connector (not shown) provided in the cover 18. The ECU determines the throttle opening according to the change in the magnetic field of the magnet 38 as a magnetic physical quantity, and performs various control operations, such as fuel injection control, correction control on the opening of the throttle valve 2, and gear change control for automatic transmission, according to the vehicle speed detected by a vehicle speed sensor (not shown), etc. The magnet 38, the circuit board 40, and the Hall element 41 constitute a throttle sensor 42.

In the above-described throttle control device, when the engine is started, drive control is performed on the motor 4 based on a signal from the ECU, whereby, as described above, the throttle valve 2 is opened or closed through the speed reduction gear mechanism 35, with the result that the amount of intake air flowing through the intake passage 1a of the throttle body 1 is controlled.

Figure 4:
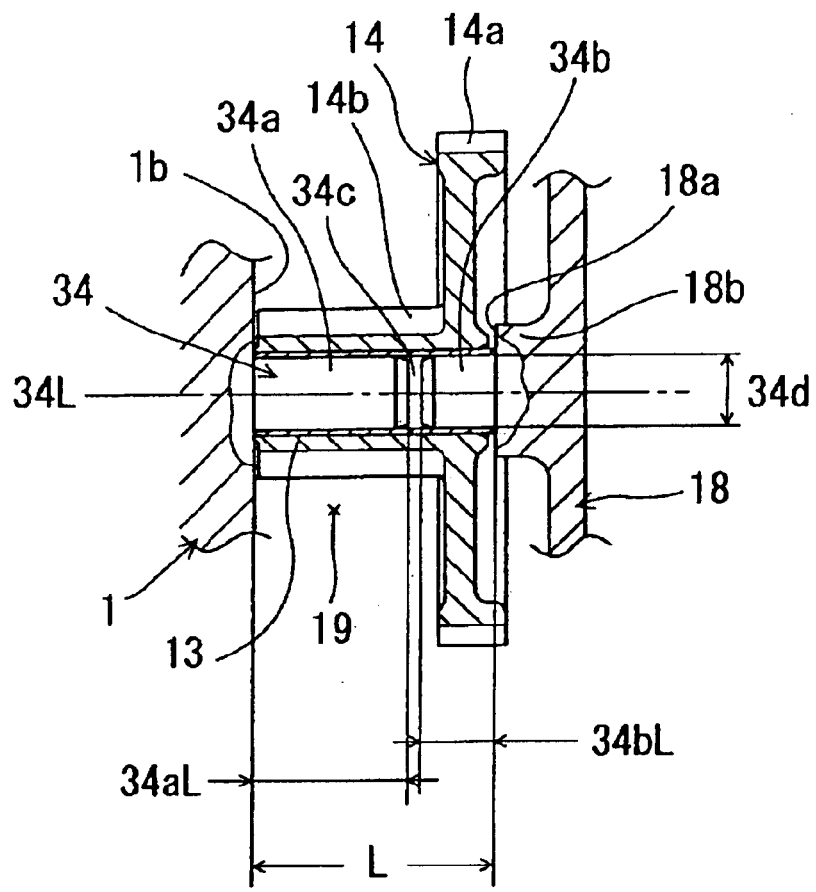
FIG. 4 is a sectional view showing a counter shaft support structure in a gear mechanism.
Figure 5:
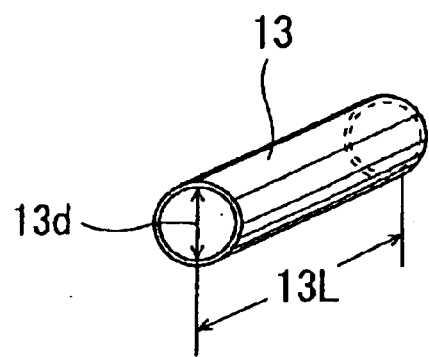
FIG. 5 is a perspective view of a collar.

Further, as shown in FIG. 4, in the above-described throttle control device, the counter shaft 34, rotatably supporting the counter gear 14, is composed of a pair of shaft halves 34a and 34b, the term halves referring to the left and right hand side as shown in FIG. 4, not necessarily as an indication of size. One shaft half 34a (the left-hand side shaft pictured in FIG. 4) is formed integrally with a side wall surface 1b of the main body 1 on the surface within the gear accommodating chamber 19. The other shaft half 34b (the right-hand side shaft pictured in FIG. 4) is formed integrally with a wall surface 18a of the cover 18, also on the surface within the gear accommodating chamber 19. As the shaft half 34b transitions to the wall surface 18a, the diameter of shaft half 34b swells to form a boss portion 18b. The wall surface 1b of the main body 1 and the wall surface 18a of the boss portion 18b of the cover 18 are opposed to each other in the assembled state in which the main body 1 and the cover 18 are attached to each other. Further, the distance L between the wall surface 1b and the wall surface 18b is set to a dimension limiting the axial positional deviation of the counter gear 14 in the horizontal direction (the left and right directions in FIG. 4). The two shaft halves 34a and 34b in the assembled state are arranged such that they are aligned substantially along the same axis 34L. Further, the axial length 34aL of the shaft half 34a and the axial length 34bL of the shaft half 34b are set such that a predetermined gap 34c remains between the assembled shaft halves 34a and 34b.

A metal collar 13 is attached to the counter shaft 34 so as to extend over the two shaft halves 34a and 34b. In forming this collar 13, a metal with superior wear resistant qualities is preferred. The counter gear 14 is rotatably supported on the collar 13. The collar 13 is formed as a hollow cylinder. Its inner diameter 13d (See FIG. 5) is large enough to allow insertion of the two shaft halves 34a and 34b with some clearance provided. As an example, the inner diameter of the collar 13 is set to be approximately 0.1 mm larger than the outer diameter 34d of the shaft halves 34a and 34b. This allows the collar 13 to be easily assembled onto the two shaft halves 34a and 34b.

Further, the axial length 13L of the collar member 13 (See FIG. 5) is set to be slightly larger than the distance between the wall surface 1b of the main body 1 and the wall surface 18a of the cover 18, this is distance L (FIG. 4). Because of this arrangement, when the main body 1 and the cover 18 are connected together after fitting the collar 13 onto the two shaft halves 34a and 34b of the counter shaft 34, the collar 13 is fixed in position by compression due to the wall surfaces 1b and 18a. The result is that collar 13 is held in such a way so as not to be capable of relative rotation with respect to the counter shaft 34. There is no requirement to provide a separate fixing means for securing the collar 13 in position. However, although not required a separate fixing means such as adhesive could still be used without leaving the scope of the current invention.

As described above, in the throttle control device of this embodiment, the speed reduction gear mechanism 35 includes the counter gear 14 for transmitting the driving force of the motor 4 to the throttle valve 2. The counter shaft 34 (See FIG. 1) rotatably supporting the counter gear 14 is composed of the shaft halves 34a and 34b. Further, since the shaft halves 34a and 34b are formed integrally with the mutually opposing wall surfaces 1b and 18a, there is no need to provide a counter shaft that is a separate component apart from the throttle body TB (See FIG. 1). As a result, it is possible to achieve reduction in the number of components, the number of assembly steps, and cost. Further, due to the combination of the shaft halves 34a and 34b, a structure referred to as a double-end-support type counter shaft 34 is formed. This allows the counter shaft 34 to have improved support strength for a smaller diameter shaft.

In this embodiment, the collar 13, superior in wear resistance, is interposed between the counter shaft 34 and the counter gear 14. Since the preferred counter gear 14 is formed of metal and the preferred counter shaft 34 is formed of resin, the counter shaft 34 has generally inferior wear resistance when compared to the counter gear 14. Because of this, in this embodiment the collar member 13 does not rotate relative to the counter shaft 34. Therefore it is possible to limit the wear of the counter shaft 34 formerly associated with direct rotating sliding contact of counter gear 14. However in the case of another embodiment where counter gear 14 is poorer in wear resistance than the counter shaft 34, the collar member 13 may be shorter in length and fixed in position relative to counter gear 14, limiting wear of the counter gear 14 otherwise due to the rotating sliding contact with the counter shaft 34.

[Second Embodiment]

Figure 6:
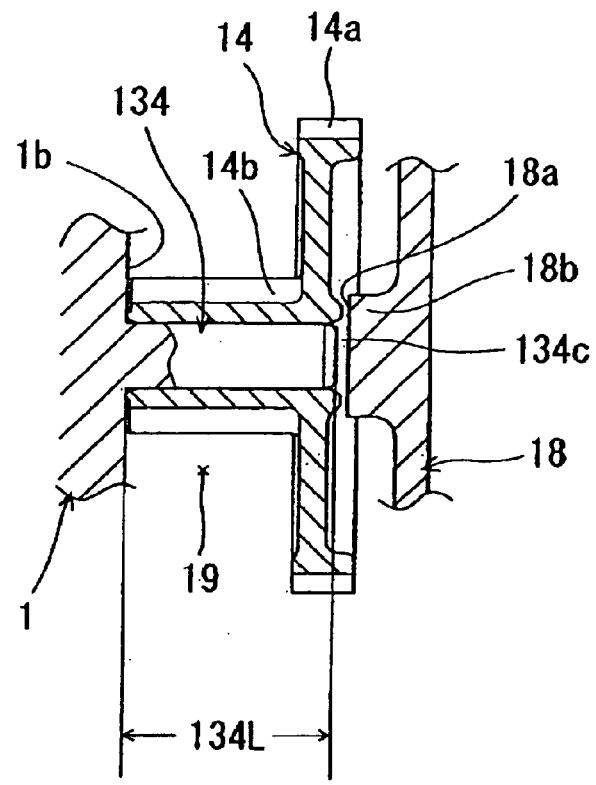
FIG. 6 is a sectional view similar to FIG. 4, showing a throttle control device according to a second embodiment of the present invention.

A throttle control device according to a second embodiment of the present invention will be described with reference to FIG. 6. The second embodiment consists of a partial modification of the first embodiment. For the sake of brevity, only the differences between the first and second embodiments will be described. In FIG. 6, the components previously described in FIGS. 1 to 5 are indicated by the same reference numerals in FIG. 6. A repeated description of these identical components will be omitted.

The second embodiment only uses one of the half shafts. In this illustration, the embodiment does not employ an element corresponding to the shaft half 34b (See FIG. 4) of the first embodiment. As shown in FIG. 6, a counter shaft 134 is formed integrally with the wall surface 1b of the main body 1 in a cantilever fashion. The axial length 134L of the counter shaft 134 is set such that the forward end of the counter shaft 134 is separated from the wall surface 18a of the boss portion 18b of the cover 18 by a distance 134c. While the throttle control device of the second embodiment has no collar member 13 (See FIG. 4) of the first embodiment, it is within the scope of the second embodiment to provide the collar member 13 as enabled in the first embodiment.

The second embodiment as described above provides many of the same benefits as of the first embodiment. Additionally, it is also possible to omit the shaft half 34a on the side of the main body 1 by forming the counter shaft integrally with the wall surface 18a of the boss portion 18b of the cover 18 in a cantilever fashion.

[Third Embodiment]

Figure 7:
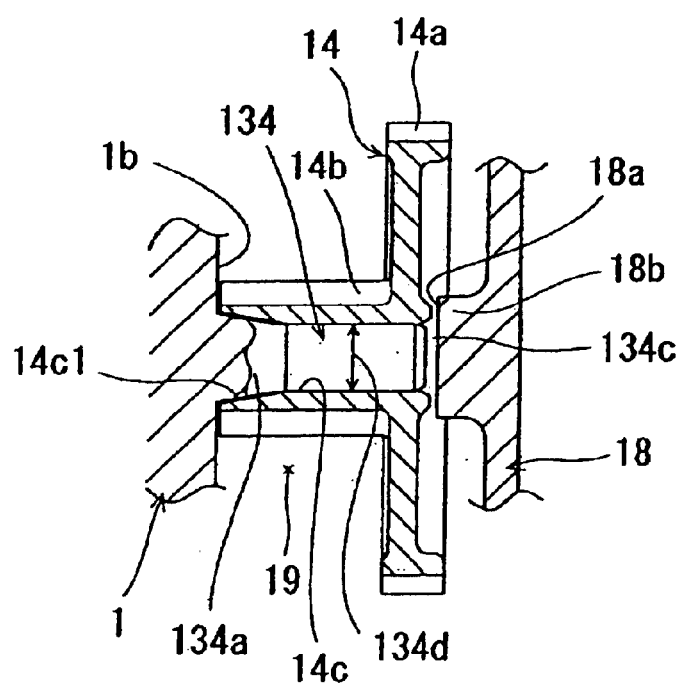
FIG. 7 is a sectional view similar to FIG. 6, showing a throttle control device according to a third embodiment of the present invention.

A throttle control device according to a third embodiment of the present invention will be described with reference to FIG. 7. The third embodiment consists of a partial modification of the second embodiment. Therefore, only the differences between the second and third embodiments will be described. In FIG. 7, the components previously described in FIG. 6 are indicated by the same reference numerals in FIG. 7, and a repeated description of these identical components will be omitted.

In the throttle control device of the third embodiment, the base end portion 134a of the counter shaft 134 is tapered, more specifically, the end portion on the side of the wall surface 1b of the main body 1. The outer diameter of the base end portion 134a gradually increases in diameter as the shaft approaches the wall surface 1b of the main body 1. Corresponding to this, the axial cavity 14c of the counter gear 14 has a tapered portion 14c1 in conformity with the tapered configuration of the base end portion 134a of the counter shaft 134.

The third embodiment described above provides the same benefits as those of the second embodiment. However, by tapering the base end portion 134a of the counter shaft 134, it is possible to enhance the support strength of the counter shaft 134.

The present invention is not restricted to the first through third embodiments described above. Various modifications and variations of the above embodiments are possible without departing from the scope of the present invention. For example, while in the above embodiments the main body 1 and the cover 18 are formed of resin, they may also be formed of some other material, for example metal. Further, the throttle gear 14, formed of metal in the above embodiments, may also be formed of some other material, such as resin. Similarly, the throttle valve 2, which is preferably formed of resin, may be formed of some other material such as metal. Additionally, the construction of the throttle sensor 42 is not limited to the constructions depicted in the above-described embodiments, it is possible to adopt various types of construction.

What is claimed is:

1. A throttle control device comprising:
    a throttle body in which an intake passage is defined;
    a throttle valve rotatably disposed within the intake passage;
    a motor for rotating the throttle valve;
    a gear accommodating chamber defined in the throttle body;
    a gear mechanism disposed within the gear accommodating chamber, the gear mechanism arranged and constructed so as to transmit rotation of the motor to the throttle valve, the gear mechanism including at least one gear; and
    a shaft rotatably supporting the gear;
    wherein the gear accommodating chamber has a first wall surface and a second wall surface opposed to each other in an axial direction of the shaft, and wherein the shaft has a first shaft portion formed on the first wall surface in a cantilever fashion and a second shaft portion formed on the second wall surface in a cantilever fashion.

2. A throttle control device according to claim 1, wherein a gap is provided between assembled ends of the first shaft portion and the second shaft portion.

3. A throttle control device according to claim 2, wherein a reinforcing portion is formed with the first shaft portion on the first wall surface and/or with the second shaft portion on the second wall surface.

4. A throttle control device according claim 3, wherein the gear comprises a counter gear.

5. A throttle control device according claim 4, further comprising a collar provided between the shaft and the gear, the collar being formed of a material superior in wear resistance to that of the shaft and/or the gear.

6. A throttle control device according to claim 5, wherein the collar is fixed in position relative to one of the shaft or the gear, whichever one is formed of a material of lower wear resistance, and the collar is in sliding contact with the other of the shaft or the gear.

7. A throttle control device according to claim 1, wherein a reinforcing portion is formed with the first shaft portion on the first wall surface and/or with the second shaft portion on the second wall surface.

8. A throttle control device according to claim 7, wherein the gear comprises a counter gear.

9. A throttle control device according to claim 8, further comprising a collar provided between the shaft and the gear, the collar being formed of a material superior in wear resistance to that of the shaft and/or the gear.

10. A throttle control device according to claim 9, wherein the collar is fixed in position relative to one of the shaft or the gear, whichever one is formed of a material of lower wear resistance, and the collar is in sliding contact with the other of the shaft or the gear.

11. A throttle control device comprising:
    a throttle body in which an intake passage is defined;
    a throttle valve rotatably disposed within the intake passage;
    a motor for rotating the throttle valve;
    a gear accommodating chamber defined in the throttle body;
    a gear mechanism disposed within the gear accommodating chamber, the gear mechanism arranged and constructed so as to transmit a rotation of the motor to the throttle valve, and the gear mechanism having at least one gear; and
    a shaft rotatably supporting the gear,
    wherein the gear accommodating chamber has a wall surface, and wherein the shaft is a single member formed in a cantilever fashion on the wall surface.

12. A throttle control device according to claim 11, wherein the wall surface includes a first wall surface and a second wall surface opposed to each other in an axial direction of the shaft, and wherein the shaft is formed integrally with one of the first or second wall surfaces, with a gap being provided between an end of the shaft and the other of the first or second wall surfaces.

13. A throttle control device according to claim 12, wherein the shaft is equipped with a reinforcing portion disposed at one end of the shaft nearest to the one wall surface.

14. A throttle control device according to claim 13, wherein the reinforcing portion is a tapered portion whose diameter gradually increases toward the one wall surface.

15. A throttle control device according to claim 14, wherein the gear comprises a counter gear.

16. A throttle control device according to claim 15, further comprising a collar provided between the shaft and the gear, the collar being formed of a material superior in wear resistance to that of the shaft and/or the gear.

17. A throttle control device according to claim 16, wherein the collar is fixed in position relative to one of the shaft or the gear, whichever one is formed of a material of lower wear resistance, and the collar is in sliding contact with the other of the shaft or the gear.

18. A throttle control device according to claim 1, wherein the gear comprises a counter gear.

19. A throttle control device according to claim 11, wherein the gear comprises a counter gear.

20. A throttle control device according to claim 1, further comprising a collar provided between the shaft and the gear, the collar being formed of a material superior in wear resistance to that of the shaft and/or the gear.

21. A throttle control device according to claim 20, wherein the collar is fixed in position relative to one of the shaft or the gear, whichever one is formed of a material of lower wear resistance, and the collar is in sliding contact with the other of the shaft or the gear.

22. A throttle control device according to claim 11, further comprising a collar provided between the shaft and the gear, the collar being formed of a material superior in wear resistance to that of the shaft and/or the gear.

23. A throttle control device according to claim 22, wherein the collar is fixed in position relative to one of the shaft or the gear, whichever one is formed of a material of lower wear resistance, and the collar is in sliding contact with the other of the shaft or the gear.

24. A throttle control device according to claim 1, wherein the throttle body has a main body and a cover which is coupled to the main body and which is a separate component apart from the main body, wherein the gear accommodating chamber is formed between the main body and the cover, and wherein the first wall surface is formed by the throttle body main body and the second wall surface is formed by the cover.

25. A throttle control device according to claim 12, wherein the throttle body has a main body and a cover which is coupled to the main body and which is a separate component apart from the main body, wherein the gear accommodating chamber is formed between the main body and the cover, and wherein the first wall surface is formed by the throttle body main body and the second wall surface is formed by the cover.

* * * * *